Sept. 22, 1959 W. E. SARGEANT 2,905,904
TIMING CONTROL CIRCUIT
Filed June 25, 1956 2 Sheets-Sheet 1

INVENTOR.
Walter E. Sargeant
BY
E. W. Christen
ATTORNEY.

Sept. 22, 1959 W. E. SARGEANT 2,905,904
TIMING CONTROL CIRCUIT
Filed June 25, 1956 2 Sheets-Sheet 2

INVENTOR.
Walter E. Sargeant
BY
E. W. Christen
ATTORNEY.

United States Patent Office 2,905,904
Patented Sept. 22, 1959

2,905,904

TIMING CONTROL CIRCUIT

Walter E. Sargeant, Huntington Woods, Mich., assignor to General Motors Corporation, Detroit, Mich., a corporation of Delaware Application June 25, 1956, Serial No. 593,617

7 Claims. (Cl. 331—35)

This invention relates to control circuits and more particularly to a timing control circuit for a time keeping or measuring instrument.

It is desirable in electrically controlled time keeping instruments such as automobile clocks to generate a periodic impulse from a direct current source. In automobile clocks, for example, such a periodic impulse may be employed for energizing the actuating coil of a counting or clock mechanism. Heretofore, it has been a common practice to derive such a periodic impulse by use of circuit interrupting contacts controlled by the regulating mechanism such as the balance wheel or the pendulum of the clock. The use of repetitively operated, current carrying contacts leads to premature clock failure and may cause disturbance of the regulating mechanism.

Accordingly, it is an object of this invention to provide a control circuit for a timing device for generating timing impulses of accurately controlled frequency without the use of circuit interrupting contacts.

An additional object of the invention is to provide a timing control circuit in which the frequency of timing impulses is determined by a contact free regulating mechanism.

A further object of the invention is to provide a timing impulse generating circuit energized from a direct current source for developing impulses of a frequency determined by reactance variation introduced by a regulating mechanism.

In accordance with this invention timing impulses are generated at a frequency corresponding to that of an oscillatory mass or regulating mechanism. A tuned circuit, including a reactance element varied by the motion of the regulating mechanism, is excited from an oscillator and a sensing circuit coupled to the tuned circuit responds to the reactance variation to develop an output impulse. The output impulse is utilized to maintain the regulating mechanism in a state of oscillation at its natural frequency and is also used for energization of any desired utilization device such as a counting or time indicating instrument.

A more complete understanding of the invention may be had from the detailed description which follows taken with the accompanying drawings in which.

Figure 1:
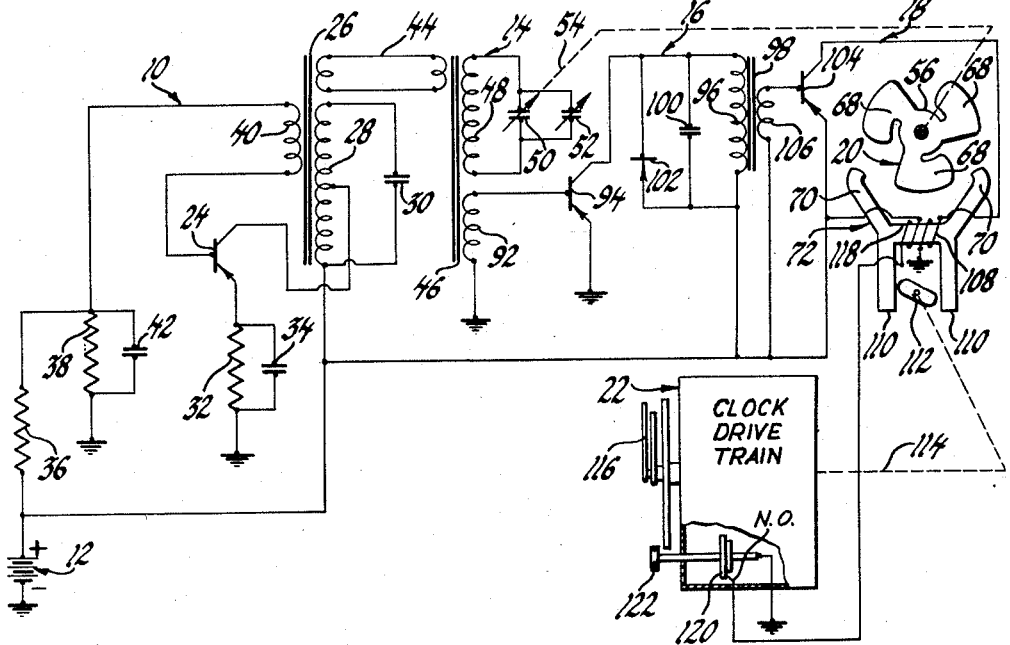
Figure 1 is a schematic circuit diagram of the inventive control circuit.

Referring now to the drawings, there is shown an illustrative embodiment of the invention in a control circuit especially adapted for developing timing impulses for an automobile clock. In general, the control circuit comprises an oscillator 10 energized from a direct current source or battery 12 and coupled with a variably tuned circuit 14. The circuit 14 is coupled through a sensing circuit 16 which applies a signal voltage to an output circuit 18 for energizing a regulating mechanism 20 to vary the resonant frequency of the circuit 14. The output circuit 18 also energizes the utilization device 22.

The oscillator circuit 10 is suitably a fixed frequency feedback oscillator employing a transistor 24 connected in grounded emitter configuration. The oscillator 10 is energized from the battery 12 and has an output circuit including the coupling transformer 26 which has a tuned primary circuit including the primary winding 28 and the condenser 30. The output circuit of the transistor 24 may be traced from the collector electrode to the center tap of primary winding 28 and thence from the lower terminal of the primary winding through the battery 12 to a point of common reference potential or ground. The circuit is completed through a temperature compensating emitter circuit resistor 32 and shunt condenser 34 to the emitter electrode. The input circuit of the transistor 24 includes a source of bias voltage provided by the voltage divider including the resistor 36 and resistor 38 serially connected between the upper terminal of battery 12 and the point of common reference potential. The input circuit may be traced from the base electrode through the feedback winding 40 of transformer 26 and through resistor 38 and condenser 42 in parallel to the point of common reference potential and thence through the emitter circuit resistor 32 and shunt condenser 34 to the emitter electrode.

The output circuit of the oscillator 10 is connected by an inductive link coupling 44 from transformer 26 to coupling transformer 46. The transformer 46 includes a secondary winding 48 with a variable tuning condenser 50 and an adjustable trimmer condenser 52 connected across its terminals. The variable tuning condenser 50 is actuable through a mechanical connection 54 with the regulating mechanism 20 which will be described in greater detail presently.

Figure 3:
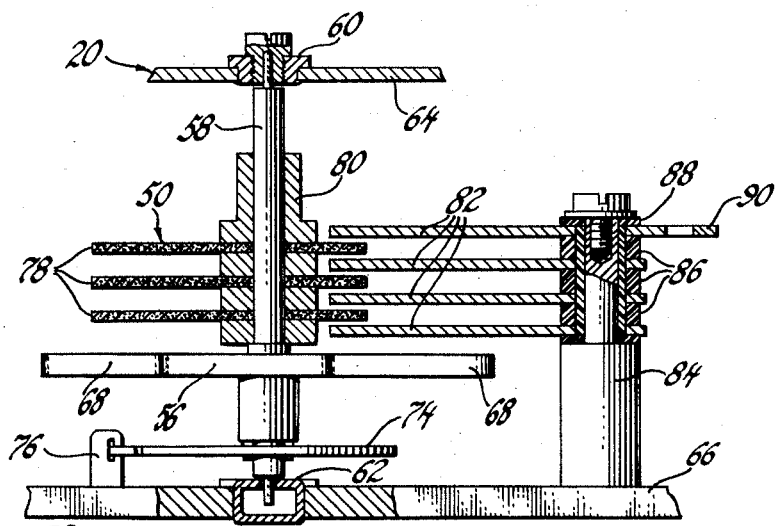
Figure 3 is a view, partially in section, of the regulating mechanism including a variable condenser of the control circuit.
Figure 4:
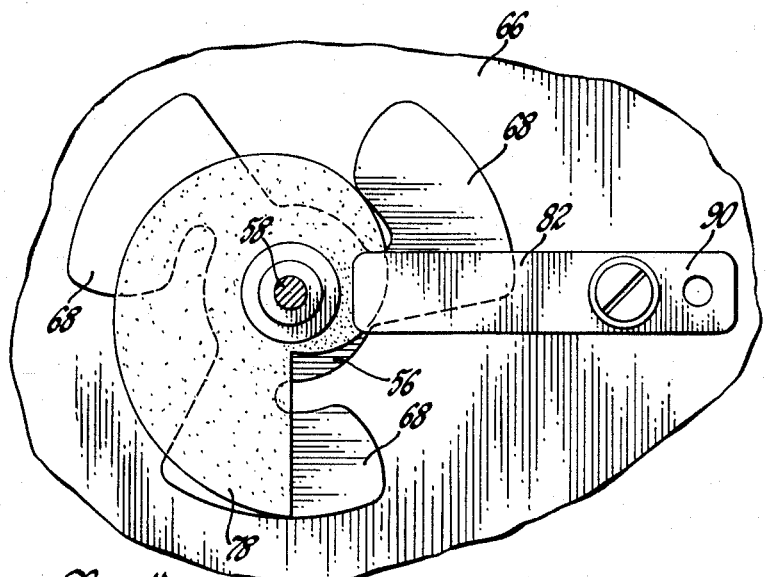
Figure 4 is another view of the regulating mechanism of Figure 3.

As shown in Figures 3 and 4, the regulating mechanism 20 suitably takes the form of a balance wheel or torsional pendulum. It comprises a balance wheel armature or oscillatory mass 56 mounted upon a shaft or pivot staff 58 which is journalled in frictionless bearings 60 and 62 in upper and lower support plates 64 and 66, respectively. The balance wheel armature 56 is provided with equally spaced pole pieces 68 of soft iron or the like which are magnetically coupled with the field poles 70 of the field structure 72 to be described subsequently. The pivot staff 58 is resiliently constrained against rotative displacement from a reference position by a hairspring 74, in a well known manner. The hairspring is secured at its inner end to the pivot staff and at its outer end to a post 76 on the mounting plate 66.

The oscillatory pivot staff 58 supports the movable conductive plates 78 of the variable condenser 50 by means of a sleeve or bushing 80. The condenser plates 78 are electrically connected together, suitably through the bushing 80, and to ground through the pivot staff and support plate 66 which may constitute one terminal of the condenser 50. The plates 78 are of spiral configuration terminating in a radially extending portion and mesh with a set of fixed condenser plates supported on a stand-off 84 which is mounted on support plate 66. The fixed plates 82, of rectangular configuration, are electrically connected together through conductive washers 86 and are insulated from the stand-off 84 by insulating sleeve 88. The condenser 50 is provided with another terminal 90.

The capacitance variation of the condenser 50 increases substantially as a linear function of shaft displacement throughout a first range of movement corresponding to the alignment of the spiral portion of the movable plates with the fixed plates. In a second range of movement corresponding to the alignment of the radial portion with the fixed plates the capacitance variation decreases as a different, but suitably linear, function of displacement. It will be apparent that the resonant frequency of the tuned circuit 14 is varied by displacement of the regulating mechanism 20. Preferably, this variation of resonant frequency is in the vicinity of the frequency of oscillator 10 and over a substantially linear portion of the resonance curve of the tuned circuit. Consequently, the resonant frequency of the tuned circuit may be varied cyclically by oscillation of the regulating mechanism 20.

In order to develop periodic impulses corresponding to the positional variation of the regulating mechanism 20 the sensing circuit 16 is provided. It has been found advantageous to sense the positional variation by utilizing a circuit 16 responsive to the reactance variation as manifested by the voltage translation of the tuned circuit 14. In particular, the sensing circuit 16 is a differentiating network adapted to provide a voltage impulse in response to a change of rate of reactance variation. The circuit 16 is coupled to the tuned circuit 14 by secondary winding 92 on transformer 46 through a transistor amplifier 94, preferably operated at cut-off. The input circuit of the amplifier extends between the base and emitter electrodes and includes the winding 92 in series. The output circuit of the amplifier extends between the collector and emitter electrodes and includes, in parallel connection, the primary winding 96 of transformer 98, the filter condenser 100, and the rectifying device or diode 102. The filter condenser 100 and winding 96 constitute a frequency selective circuit of low-pass characteristics such that the high frequency components of the order of magnitude of the oscillator frequency are by-passed to ground whereas low frequency components of the order of magnitude of the oscillation frequency of the regulating mechanism develop a voltage across the winding 96 proportional to the time rate of change or first time derivative of the input voltage to the amplifier 94. The diode 102 is effective to eliminate voltages of one polarity.

The output voltage of the sensing circuit 16 is applied through transformer 98 to the transistor amplifier 104 having an input circuit between base and emitter electrodes which includes secondary winding 106. The output circuit extends between the collector and emitter electrodes and includes the energizing winding 108 on the field structure 72. As previously mentioned, the field structure includes the field poles 70 for energization of the balance wheel armature 56. It also includes field poles 110 and a magnetically coupled armature 112 which is suitably connected through linkage 114 to a clock drive train 22 provided with a time indicating means 116. The field structure 72 is provided with a starting winding 118 having one terminal connected to one terminal of battery 12 and the other terminal connected through starting switch 120 to the other terminal of the battery. The starting switch 120 is normally open and is actuated by the setting stem 122 of the clock drive train.

Figure 2:
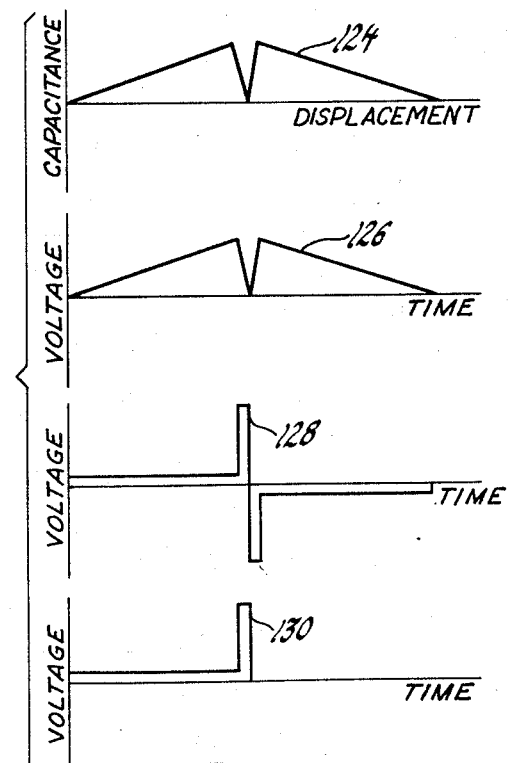
Figure 2 represents wave forms of typical circuit values to aid in explanation of the circuit operation.

The operation of the inventive control circuit will be described with reference to Figures 1 and 2. When the starting switch 120 is closed momentarily the starting winding 118 is energized and the balance wheel armature is displaced to align the pole pieces 68 with field poles 70. Upon opening the switch 120 the balance wheel commences oscillation under the influence of the hairspring. The control circuit is continuously energized from the battery 12. Thus, the oscillator 10 is in a state of oscillation at a frequency determined by its circuit parameters and the tuned circuit 14 is excited thereby. The capacitance of variable condenser 50 is caused to vary by displacement of the balance wheel in a manner illustrated by curve 124 of Figure 2. This cyclical variation of capacitance causes the voltage across the tuned circuit to vary as a function of time in a similar manner as shown by curve 126. This voltage is amplified by amplifier 94 and applied to the differentiating circuit 16 which develops a positive and negative voltage peak or impulse upon the change of rate of voltage variation as shown by curve 128. The negative voltage impulse is effectively eliminated by the rectifier 102. As a result a single voltage impulse per cycle of capacitance variation as shown in curve 130 is applied through amplifier 104 to the energizing winding 108. This impulse is effective to sustain oscillations of the balance wheel at its natural frequency and energize the armature 112 to drive the clock drive train 22.

Although the description of this invention has been given with respect to a particular embodiment it is not to be construed in a limiting sense. Many variations and modifications within the spirit and scope of the invention will now occur to those skilled in the art. For a definition of the invention, reference is made to the appended claims.

I claim:

1. A timing circuit for developing periodic impulses comprising an oscillator, a variably tuned circuit excited by the oscillator and including a variable reactance, a regulating mechanism having a periodic oscillating member connected with the variable reactance for cyclically varying the resonant frequency of the tuned circuit over a predetermined range of frequency, frequency selective means coupled with the tuned circuit for developing a voltage impulse corresponding to each cyclical variation of the resonant frequency, and driving means coupled with the frequency selective means and drivingly coupled with the regulating mechanism for sustaining oscillations of the periodic oscillating member.

2. A timing circuit for developing periodic impulses comprising a fixed frequency oscillator, a variably tuned circuit excited by said oscillator and including a variable reactance element, a regulating mechanism having a periodic oscillating member connected with the reactance element for cyclically varying the resonant frequency of the tuned circuit over a predetermined range including an abrupt change of resonant frequency, and a differentiating circuit coupled with the tuned circuit and responsive to the abrupt change of resonant frequency for developing a voltage impulse.

3. A timing circuit for developing periodic impulses comprising a fixed frequency oscillator, a variably tuned circuit coupled with the output circuit of the oscillator and including a variable reactance element, a regulating mechanism having a periodic oscillating member connected with the reactance element for cyclically varying the resonant frequency of the tuned circuit over a predetermined range including an abrupt change of resonant frequency, a differentiating circuit coupled with the tuned circuit and responsive to the abrupt change of resonant frequency for developing a voltage impulse and electromagnetic means connected with the differentiating circuit and energized by said impulse for sustaining oscillations of said member.

4. A timing circuit for developing periodic impulses comprising a fixed frequency oscillator, a variably tuned circuit coupled with the output circuit of said oscillator and including a variable reactance element, a regulating mechanism including a periodic oscillating member connected with the reactance element for cyclically varying the resonant frequency over a predetermined range adjacent said fixed frequency, the cyclical variation including portions of different rates of change with respect to time, a filter circuit coupled with the tuned circuit for eliminating the high frequency components in the frequency range of the fixed frequency, and a differentiating circuit coupled with the filter circuit for developing a voltage impulse corresponding to the occurrence of a different rate of change of the resonant frequency.

5. A timing circuit for developing periodic impulses comprising a fixed frequency oscillator, a variably tuned circuit coupled with the output circuit of the oscillator, a regulating mechanism including an oscillatory balance wheel armature mounted on a pivot staff, a variable condenser having a movable element mounted on the pivot staff and being connected in said variably tuned circuit for cyclical variation of the resonant frequency thereof by oscillation of the balance wheel armature, the cyclical variation including a non-linear variation with respect to time, a differentiating circuit responsive to frequencies in the range of the cyclical variation and coupled with the tuned circuit for developing a voltage impulse upon the occurrence of said non-linear variation, driving means coupled with the differentiating circuit for energization thereby and coupled with the balance wheel armature to sustain oscillations thereof.

6. A timing circuit for developing periodic impulses comprising an oscillator, a variably tuned circuit excited from said oscillator, a regulating mechanism including an oscillatory balance wheel armature mounted on a pivot staff, a variable condenser having a movable element mounted on the pivot staff and being connected in said variably tuned circuit for cyclical variation of the resonant frequency thereof by oscillation of the balance wheel armature, and frequency selective means connected with the tuned circuit for developing a voltage impulse corresponding to each cyclical variation of the resonant frequency.

7. A timing circuit for developing periodic impulses comprising a fixed frequency oscillator, a variably tuned circuit coupled with the output circuit of the oscillator, a regulating mechanism including an oscillatory balance wheel armature mounted on a pivot staff, a variable condenser having a movable element mounted on the pivot staff and being connected in the tuned circuit for cyclical variation of the resonant frequency thereof by oscillation of the balance wheel armature, the capacitance variation of the condenser, as a function of displacement, including an abrupt change whereby an abrupt change of resonant frequency occurs as a function of time, a filter circuit connected with the tuned circuit for eliminating frequencies in the range of the oscillator frequency, a differentiating circuit connected with the filter circuit for developing a voltage impulse upon the occurrence of the abrupt changes of resonant frequency, a rectifier connected therewith for eliminating impulses of one polarity, and driving means coupled with the differentiating circuit for energization thereby and coupled with the balance wheel armature to sustain oscillations thereof.

References Cited in the file of this patent

UNITED STATES PATENTS

| | | |
|---|---|---|
| 1,831,933 | Taylor | Nov. 17, 1931 |
| 2,153,179 | Fitch | Apr. 4, 1939 |
| 2,259,613 | Cerveny | Oct. 21, 1941 |
| 2,534,155 | Wintle | Dec. 12, 1950 |
| 2,756,286 | Johnson et al. | July 24, 1956 |